United States Patent [19]

Coscia et al.

[11] 4,137,165

[45] Jan. 30, 1979

[54] PROCESS FOR CLARIFYING RAW WATER

[75] Inventors: Anthony T. Coscia, South Norwalk; Michael N. D. O'Connor, Norwalk, both of Conn.

[73] Assignee: American Cyanamid Company, Stamford, Conn.

[21] Appl. No.: 792,746

[22] Filed: May 2, 1977

Related U.S. Application Data

[63] Continuation-in-part of Ser. No. 735,577, Oct. 26, 1976, abandoned.

[51] Int. Cl.$^2$ .............................................. B01D 21/01
[52] U.S. Cl. ...................................................... 210/54
[58] Field of Search ................................... 210/52–54; 260/29.4 UA; 526/23, 54

[56] References Cited

U.S. PATENT DOCUMENTS

| 3,014,896 | 12/1961 | Colwell et al. | 210/54 C |
|---|---|---|---|
| 3,023,162 | 2/1962 | Fordyce et al. | 210/54 C |
| 3,578,586 | 5/1971 | Gal et al. | 210/49 |
| 3,864,312 | 2/1975 | Suzuki et al. | 210/54 C |
| 3,897,333 | 7/1975 | Field et al. | 210/54 C |
| 3,907,758 | 9/1975 | Sackman et al. | 210/54 C |
| 3,943,114 | 3/1976 | Hoke | 210/54 C |
| 3,956,122 | 5/1976 | Coscia et al. | 210/54 C |
| 4,024,328 | 5/1977 | Zweigle | 210/54 C |

*Primary Examiner*—Frank A. Spear, Jr.
*Assistant Examiner*—Peter A. Hruskoci
*Attorney, Agent, or Firm*—William J. van Loo

[57] ABSTRACT

Use of a low molecular weight polyacrylamide modified to provide quaternized dimethylaminomethyl groups in the clarification of raw water provides improved clarification.

5 Claims, No Drawings

PROCESS FOR CLARIFYING RAW WATER

CROSS-REFERENCE TO RELATED APPLICATIONS

This application is a continuation-in-part of application Ser. No. 735,577, filed on Oct. 26, 1976 now abandoned. This application is also related to application Ser. Nos. 792,744 and 792,745, filed on even date herewith. The first related application teaches a process for clarifying iron ore slimes, the second teaches a process for clarifying coal wash waters, while the present application teaches clarification of raw water.

This invention relates to an improved process for clarifying raw waters. More particularly, this invention relates to such a process wherein a low molecular weight quaternized dimethylaminomethyl acrylamide polymer is employed as clarifying agent.

Recent developments in the field of water-soluble polymers have led to materials that are effective in water treatment to remove undesirable materials suspended therein. The separation of suspended particles from aqueous suspensions thereof is generally referred to as "flocculation." Such general term can include a wide range of aqueous systems varying from a minor amount of inorganic solids in aqueous suspension, such as raw water, to high concentrations of organic wastes in aqueous suspension, such as sewage sludges. Because of this widely diverse nature of the various solids-water systems, the agents provided for such utility are generally provided in a form that offers versatile performance, i.e., suitable for use with a wide variety of solids-water systems.

For certain solids-water systems, such as raw waters, these polymeric agents are used to clarify the water by removal of inorganic solids suspended therein. For other solids-water systems, such as sewage sludges, the polymeric agents are used primarily to dewater the sludge so that the solids may be readily disposed of without prohibitive amounts of water being associated therewith. These distinct applications of the polymeric agents give rise to different requirements as to the nature of the agents employed.

One teaching with respect to certain prior art flocculants is that, in general, increased effectiveness arises with increased molecular weight of the polymeric agent employed, see U.S. Pat. No. 3,738,945 for example. Another teaching with respect to another type of prior art flocculants is that there is a certain high molecular weight value at which maximum effectiveness occurs and above which effectiveness remains essentially unchanged, see U.S. Pat. No. 3,897,333 for example. Accordingly, one seeking an effective flocculant for the various solids-water systems contemplated by such application of polymeric agents would provide such agent in high molecular weight range.

Typically, polymeric agents that are used in flocculation applications have molecular weights in excess of about 200,000, usually in the range of about 500,000 to several million, and in difficult solids-water systems, such as sewage sludges, frequently higher, depending upon the chemical nature of the polymeric agent. Most products that have been available for commercial use have been in the high molecular weight range so as to provide versatile utility in the wide variety of applications in which they are useful. Although the commercial products possess some degree of versatility as to usage, they do not necessarily provide the optimum performance in any given application.

Certain polymeric flocculants can be made directly from suitable reactants, such as reaction products of epichlorohydrin and dimethylamine or free-radical polymerization products of such monomers as diallyldimethylammonium chloride. Other polymeric flocculants may be made by preparing a polymer from a reactive monomer not containing certain desired functionalities and subsequently modifying the pre-formed polymer to provide the functionalities desired. In this procedure, the functionality of the pre-formed polymer can be varied in a number of respects but the degree of polymerization as it affects molecular weight of the modified polymer is determined by the polymer pre-formed.

Acrylamide is a highly reactive monomer that is widely used to provide pre-formed polymers that can be readily modified chemically to provide alternative or additional functionality for specific end-uses. Thus, acrylamide polymers may be controllably hydrolyzed to provide acrylic acid functions on the polymer structure and provide an anionic polymer. Alternatively, formaldehyde and dimethylamine can be reacted with the amide groups of the polymer to provide substituent dimethylaminomethyl functionality thereon and provide a cationic polymer. Because of the high reactivity of acrylamide monomer, however, the pre-formed polyacrylamide used for subsequent chemical modification is usually in the molecular weight range of about 200,000 to 5,000,000, since such is the degree of polymerization normally obtained. To obtain polyacrylamides of molecular weights outside this range, special preparative procedures are necessary. For higher molecular weight polyacrylamides, for example, highly purified monomer is required. Although procedures for obtaining lower molecular weight polyacrylamides are available, use of such techniques is not generally considered with respect to flocculation applications because of the preference for high molecular weight polymers.

The intrinsic viscosity of a polymer is obtained by measuring the viscosity of varying concentrations of the polymer in a specific solvent and extrapolating to a value of zero concentration, which is the value designated as "intrinsic viscosity." The viscosity is the resistance of liquid forms of the polymer to flow and is a characteristic property measuring the combined effects of adhesion and cohesion. From the intrinsic viscosity can be calculated the molecular weight of a polymer by use of appropriate equations. As is apparent, the intrinsic viscosity-molecular weight relationship of one polymer type will differ from that of another polymer type. Accordingly, the intrinsic viscosity of a polyacrylamide of a specific degree of polymerization will differ from that of a chemically modified polyacrylamide of the same degree of polymerization. The fact remains, however, that as the molecular weight, or degree of polymerization of a polymer increases, the intrinsic viscosity thereof also increases in any particular series.

A quaternized dimethylaminomethyl polyacrylamide has been previously disclosed for the treatment of sewage sludges, see U.S. Pat. No. 3,897,333. The useful polymer disclosed is one stated to have an intrinsic viscosity of at least 0.5 deciliters per gram and the examples used to illustrate the invention employ polymers having intrinsic viscosities of 1.0 and 2.5 deciliters per gram. For a quaternarized dimethylaminomethyl polyacrylamide containing at least 50 mole percent of such quaternarized groups to have an intrinsic viscosity of at least 0.5 deciliters per gram, that pre-formed polyacrylamide must have a molecular weight of about 130,000 as a minimum and to conform to examplified species must have a molecular weight of about 350,000 to 1,500,000. The degree of polymerization for such polymers would be at least 1,800 and, as exemplified, from about 5,000 to 20,000. At this range of degrees of polymerization, the polymers of the reference are said to exhibit equivalent performance in dewatering of sewage sludges, regardless of the actual degree of polymerization in such range. Absent any further teaching by the reference, one would be led to believe that the same range of intrinsic viscosities would be the most effective range for other flocculation applications.

In accordance with the present invention, there is provided a polyacrylamide chemically modified to provide a polymer consisting essentially of repeating units of the structure;

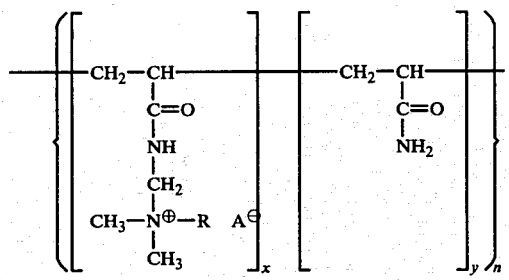

wherein $A^\ominus$ is an anion, R is an alkyl of 1-3 carbons or hydroxyalkyl of 2-3 carbons, $x$ is a mol fraction of at least about 50 percent, $y$ is a mol fraction of up to about 50 percent and represents unmodified acrylamide units and $n$ is an integer in the range of about 100 to about 1,600 to provide the chemically-modified polyacrylamide with an intrinsic viscosity in the range of about 0.1 to 0.45 deciliters per gram.

There is further provided a process for clarification of raw water containing up to about 10,000 ppm of suspended inorganic solids of a particular size up to about 2 microns which comprises: mixing with said water from about 0.1 to 20 ppm of a polyacrylamide having a content of at least about 50 mole percent of amide groups chemically-modified to contain dimethylaminomethyl groups, the dimethylaminomethyl groups being further modified by quaternization with an alkylating agent, the chemically-modified polyacrylamide having an intrinsic viscosity in the range of about 0.1 to 0.45 deciliters per gram measured in 3 molar NaCl at 30° C., to form suspendible flocs from a portion of the solids present; maintaining the suspendible flocs in suspension in said water until a substantial portion of the remaining solids is adsorbed thereto; and thereafter resettling the resulting flocs formed.

The present invention provides a polyacrylamide chemically modified to contain quaternized dimethylamimomethyl groups and of low molecular weight. Unexpectedly, such polymer type exhibits optimum performance in raw water clarification at lower molecular weight values than do other polymer types and than do higher molecular weight polymers of the same type. Because the highly effective polymers of the present invention are of low molecular weight, numerous advantages arise, which include the following:

1. The polymers of the present invention develop maximum effectiveness in raw water clarification at low molecular weight, thus eliminating disadvantages associated with providing high molecular weight polymers.

2. Because preparation of low molecular weight polymers takes less time than does preparation of high molecular weight polymers, greater productivity is obtained for a reactor of given capacity in a specific time period.

3. Because low molecular weight polymers provide low solution viscosity, chemical modification can be achieved at higher polymer concentrations than in the case of high molecular weight polymers.

4. Because chemical modification can be achieved at high polymer concentration, chemical modification is more readily and completely effected.

5. Because the polymer of the present invention is provided at high polymer concentration, shipping costs per unit weight of polymer are reduced.

6. The low molecular weight polymers of the present invention provide small, absorbent flocs which adsorb additional suspended solids of the raw water and provide greater clarification than do high molecular weight polymers which provide large, non-absorbent flocs.

7. The polymers of the present invention offer cost-performance advantages over other polymeric flocculants because of their processing advantages.

In order to prepare polymers of the present invention, it is first necessary to prepare a low molecular weight polyacrylamide in aqueous solution. By "polyacrylamide" is meant a polymer which consists essentially of repeating units of acrylamide. Although it is generally preferred to provide a homopolymer of acrylamide for optimum results in use, it is also possible to replace part of the acrylamide units with another monomer in amounts which do not interfere with the advantageous performance of the polymer in raw water clarification. Other monomers that may replace part of the acrylamide monomer include acrylonitrile, methyl methacrylate, styrene, diallyldimethylammonium chloride, methacrylamide, N,N-dimethylacrylamide, and acrylic acid. If an acidic monomer is used, it should constitute less than 10 mol percent of the polymer. It is generally preferable to introduce a high degree of chemical modification in the polyacrylamide and, therefore, the amount of comonomer employed should be minimized in order to achieve such preference. The polyacrylamide, accordingly, will consist essentially of at least 50 mol percent of acrylamide groups that have been chemically modified to provide quaternized dimethylaminomethyl groups thereon and preferably the balance of unmodified acrylamide groups or of comonomer units that do not adversely affect the performance of the polymer in the clarification of raw water. Both unmodified acrylamide units and units derived from another comonomer may be present with the required content of quaternized dimethylaminomethyl acrylamide groups.

In preparing the polyacrylamide, an aqueous solution of about 10 to 50, preferably 15 to 30, more preferably 20 to 25 weight percent of acrylamide, or monomer mixture, is employed. A number of techniques are known which can be employed to provide the desired low molecular polymer. Use of initiator contents of at least about 0.1 weight percent are effective. The use of high reaction temperatures such as at least 50° C., preferably about 70° C. to 100° C., is also effective using the initiator concentration stated. A chain transfer agent, such as isopropanol, is also effective but is not necessary. In instances wherein an impurity, such as ionic copper is present, a chelating agent, such as ethylenediamine tetracetic acid may be used to combine with this impurity. However, the presence of impurities and use of chelating agents is not necessary to prepare the low molecular weight polymer.

Free radical initiators useful at the concentration specified include, for example, ammonium persulfate, potassium persulfate, benzoyl peroxide, bromobenzoyl peroxide, t-butyl hydroperoxide, and hydrogen peroxide in the presence of ferrous ion.

As indicated, the initiated polymer solution is heated to 50° C. or higher and held at the selected temperature until the polyacrylamide of desired molecular weight is obtained. The polyacrylamide should have a degree of polymerization in the range of about 100 to 1,600. In the case of a homopolymer of acrylamide this will correspond to a molecular weight of about 7,000 to 110,000. After the desired polyacrylamide is provided, the reaction solution is cooled to about 40° C. to effect chemical modification with formaldehyde and dimethylamine.

Formaldehyde may be used as a 20 to 60 weight percent aqueous solution and dimethylamine is used as a 20 to 65 weight percent aqueous solution. The molar amount of formaldehyde employed must be sufficient to chemically modify enough acylamide groups to provide at least 50 mole percent of modified acrylamide groups in the final polymer but the amount of formaldehyde used may be sufficient to obtain a polymer consisting essentially of modified acrylamide groups, preferably a polymer containing 60–90 mole percent of modified acrylamide groups. The amount of dimethylamine employed in the chemical modification of the acrylamide groups will constitute the molar equivalent amount of dimethylamine plus about a 1 to 10 mole percent excess, preferably about 5 mole percent excess. The reaction to provide chemical modification is preferably conducted at about 40° C. for sufficient time to complete the reaction, generally in about two hours. Temperature and appropriate time modifications may be made in accordance with conventional procedures for providing this chemical modification, which is also called Mannich base formation.

After the reaction with formaldehyde and dimethylamine is complete, the reaction product is quaternized with an alkylating agent to a pH in the range of about 4 to 7. Preferred alkylating agents are dimethyl sulfate and methyl chloride but other alkylating agents may be used. The quaternizaton is preferably carried out to involve essentially all of the dimethylaminomethyl groups provided but complete reaction is not required so long as the minimum quantity of quaternized groups is provided. In the event that all of the dimethylaminomethyl acrylamide groups are not quaternized, the unquaternized dimethylaminomethyl acrylamide will represent a part of the polymer composition.

With respect to the individual steps of polymer preparation, chemical modification of the polyacrylamide to provide Mannich base modification, and quaternization of the reaction product, the conditions of reaction and useful reactants are known. The process of preparation of the product, however, is the specific combination of the individual steps involving a low molecular weight polyacrylamide as the polymer undergoing chemical modification which results in a novel polymer possessing unexpected properties when used in raw water clarification and provides unexpected processing advantages not possible when the conventional high molecular weight polyacrylamides are suitably processed.

The product obtained by the process of the present invention is a stable product which contains from about 50 to 100 mole percent of quaternized dimethylaminomethyl acrylamide groups. The degree of polymerization of the chemically modified polyacrylamide will be substantially the same as that of the starting polyacrylamide since no increase in polymer backbone molecular weight is known to arise as a result of the chemical modification effected. Accordingly, the degree of polymerization of the product polymer of the present invention will range from about 100 to 1,600. As a result of the chemical modification of the polyacrylamide, the molecular weight of the repeating units will be increased depending upon the extent to which chemical modification is effected and, accordingly, the product polymer will have a higher molecular weight than the starting polyacrylamide although the degree of polymerization is unchanged. Also, as a result of the chemical modification of the polyacrylamide, the resulting product will have different rheological properties from those of the starting polyacrylamide and consequently the intrinisic viscosity values of the starting and product polymers will differ. The intrinsic viscosity of the polymer of the invention will be in the range of about 0.1 to about 0.45, preferably about 0.2 to 0.4, deciliters per gram when measured in 3 molar sodium chloride at 30° C.

The raw waters for which the product of the present invention is a superior clarification agent are those which contain up to about 10,000 parts of suspended inorganic solids of particle size of up to about 2 microns. This should cover most raw waters encountered since gravitational setting generally occurs with waters of higher solids contents.

In carrying out clarification of a raw water as defined, an effective amount of the product of the present invention is mixed with the water to be clarified. By "an effective amount" is meant that amount which produces a desirable clarification of the water being treated. Such amount will vary widely depending upon the nature of the water being clarified, the nature of the chemically-modified polymer of the present invention employed, the specific degree of clarification desired, and the like. As a general rule, clarification agents may be used in the range of about 0.1 to 1,000 parts per million (ppm) based on the quantity of water being treated. The polymer of the present invention has generally been found to be effective in the range of about 0.1 to 20 ppm.

After the chemically-modified polymer has been mixed with the raw water being treated, small absorbent flocs involving part of the suspended solids will immediately form. These flocs, because of their nature can be kept in suspension by application of suitable agitation, usually slow speed, and while in suspension will adsorb additional suspended solids, to effect a greater degree of clarification than would be the case if the initial flocs were immediately settled and the supernatant liquor separated. The duration of time over which the initial flocs are maintained in suspension will vary widely depending upon the nature of the water being clarified and the content of solids therein, the particular polymer employed in clarification, the extent to which clarification is desired, and the like. It is generally desired to remove a substantial amount of the suspended solids remaining in the water being clarified by adsorption upon the initial flocs formed. Preferably, the suspendible flocs are maintained in suspension until the turbidity of the treated water is less than about 20% of that of the untreated water.

After the suspendible flocs have adsorbed a suitable amount of the remaining solids in suspension, the resulting flocs are allowed to settle, thus providing supernatant clarified water and a sediment of flocculated inorganic solids. The clarified water may be decanted or otherwise recovered from the sediment in accordance with conventional procedures involving the processing equipment employed. The clarified water obtained by use of the clarification process of the present invention will have a lower residual turbidity than water clarified by equal amounts of other polymeric flocculants, an equal residual turbidity at a lower dosage of polymeric flocculant than required with other polymeric flocculants, or the cost-performance requirements for the desired level of clarification will be substantially lower for the process of the present invention than for other processes.

The invention is more fully illustrated in the examples which follow wherein all parts and percentages are by weight unless otherwise specified. The following examples are preferred embodiments and are not to be construed as limitations on the scope of the claims.

EXAMPLE 1

The following example illustrates a process for manufacturing a polymer containing aminomethylated acrylamide groups quaternized with dimethylsulfate.

226 Pounds of deionized water, 0.087 pounds of ethylene diamine tetraacetic acid, disodium dihydrate salt and 0.87 pounds of isopropyl alcohol are charged to a clean reactor which is then sealed. Agitation is started and the charge is heated to 70° ± 2° C. under a stream of nitrogen. At 70° C., a 5.16 weight percent aqueous solution of ammonium persulfate (i.e., 15,000 ppm based on acrylamide) is added as rapidly as possible, the temperature is readjusted to 70° C. if necessary, and then a 50 weight percent aqueous acrylamide solution is metered in during 2 hours, while maintaining the temperature at 70° ± 2° C. The amount of acrylamide charged is calculated to give a 20 weight percent aqueous polymer solution. After all the acrylamide has been added, the batch is held at 70° C. for another hour in order to complete the polymerization, then the nitrogen flow is stopped and isopropyl alcohol is distilled off at a batch temperature of 70°-75° C. and a pressure of 225 mm. Hg. Distilling off 0.8 to 0.9 weight percent of the batch load removes 90-95 weight percent of the isopropyl alcohol as a 22 weight percent aqueous solution (Sp. Gr. 0.967). After reducing the batch to a temperature below 50° C., the batch weight is adjusted by adding an amount of deionized water equal to the weight of isopropyl alcohol solution removed during stripping. Then a premixed solution of 100 mole percent each of formaldehyde and dimethylamine based on the amount of acrylamide containing 5 mole percent excess dimethylamine is added as rapidly as possible. The dimethylamine-formaldehyde solution should be premixed and cooled below 40° C. After holding for two hours, the batch temperature is readjusted to 35° C. and then 100 mole percent of dimethylsulfate based on the amount of dimethylamine is pumped in as rapidly as possible while maintaining the batch at 35° to 40° C. to a final pH of 6.0 ± 0.2. After the dimethylsulfate has been added and the pH is stable at pH 6.0 ± 0.2, the batch is drummed off.

EXAMPLE 2

The following example illustrates another process for manufacturing a polymer of this invention without the use of a chain transfer agent and without purging the reactor with nitrogen.

A. Preparation of the Polyacrylamide Backbone 738 lb. deionized water and 0.38 lb EDTA (disodium dihydrate, 1000 ppm on monomer) are charged to a clean reactor and the pH is adjusted to 4.5 with 10% sulfuric acid solution. The reactor is sealed and the batch is heated to reflux during 1 hr. After 1 hr., 0.22 lb. of ammonium persulfate initiator is added and then 2.02 lb. of the initiator and 941 lb. of 39.7% acrylamide monomer solution (at pH 4.3) are metered in simultaneously during 90 mins. while maintaining steady reflux. After the monomer and initiator solutions have been added, the batch is held at reflux for 30 minutes to complete the polymerization and then the batch temperature is reduced to 35°-40° C.

B. Preparation of the Aminomethylated Polyacrylamide Quaternized Polymer

At 35° C., a premixed solution of 532.75 lb. of a 37 weight percent formaldehyde solution and 779.88 lb. of a 40 weight percent dimethylamine solution (1:1:1.05 mole ratio of amide: formaldehyde: amine) is added as rapidly as possible with no cooling. The batch is held 3 hours. Then the batch temperature is reduced to 20° C. and 698 lb. of dimethylsulfate is metered in at a temperature of 35° C. until the pH is reduced to 5± 0.5. After the dimethylsulfate has been added and the pH is stable the batch may be drummed off.

KAOLIN FLOCCULATION TEST

The determination of relative normalized dosage ($RD_{20}$) for the cationic flocculants was by the Kaolin flocculation test, also known as the jar test. This test represents a simulation of the actual use of the cationic flocculants as primary coagulants in the treatment of raw water from natural waterways. The turbidity present in most natural waters is similar to that represented by the suspensions used in this test. The accuracy of this test is within ± 5 percent.

A measure of the degree of quaternization of a cationic polymer may be obtained by flocculating suspensions with chlorine present. The presence of chlorine inhibits the action of the tertiary amine functions within the polymer, while the quaternary sites are unaffected by the presence of chlorine. The necessary presence of chlorine to conduct this test can be obtained with sodium hypochlorite.

The water used in the test is only mildly buffered and day to day variations will occur due to uptake of atmospheric carbon dioxide. A control should therefore be run with each day's tests to account for variation in water quality.

The results obtained are described in Examples 3 and 4 below.

EXAMPLE 3

The following illustrates the effectiveness of the cationic flocculants of this invention when clarifying raw water containing kaolin clay.

The polymer prepared by the process of Example 1 is used. A suspension of kaolin clay with negative charges on the particles of water is used as a standard test medium as this closely approaches many river waters. A stock suspension of clay is made by mixing 25 grams of kaolin in a liter of deionized water for 24 hours and then allowing settling in a graduated cylinder for 24 hours. The upper portion is decanted, such that the particle size of this fraction is not substantially in excess of 2 microns. This concentration is then diluted with water to yield a test water containing 70 ppm of kaolin. One liter samples of the test water are placed in a six-place laboratory stirrer and varying amounts of the standard compound diluted to 30 ml. added, mixing being maintained at 100 r.p.m. for one minute. This is followed by flocculation at 40 r.p.m. for 15 minutes and settling for 15 minutes. The supernatant liquid is drawn off and analyzed for residual turbidity and electrophoretic mobility. The turbidities are plotted and the dosage taken where the turbidity is 20% of that for the untreated water. A similar series of tests is run on sample of the product of interest and the relative dosage compared to the standard is calculated. The dosage is that quantity of flocculant needed to produce a turbidity which is 20% of that of the untreated water and varies with the different flocculants. The dosage of standard flocculant divided by the dosage required of the flocculant of interest and multiplied by 100 represents the relative efficiency of the product of interest at a dosage level, producing the turbidity of 20% of the untreated water $RD_{20}$.

| Intrinsic Viscosity (dl/gm.) | $RD_{20}$ |
|---|---|
| 0.7 (control) | 1.00 |
| 0.33 | 0.81 |
| 0.25 | 0.79 |
| 0.12 | 0.89 |
| 0.06 (comparative) | 1.01 |

These results show that unexpectedly quaternized dimethylaminomethylacrylamide polymers of the range of intrinsic viscosity values of the present invention are superior in dosage requirements for providing a specific level of clarification of raw waters than are similar polymers of intrinsic viscosity outside this range.

We claim:

1. A process for clarification of raw water from natural waterways containing up to about 10,000 ppm of suspended inorganic solids of a particle size up to about 2 microns which comprises: mixing with said water from about 0.1 to 20 ppm of a water soluble polymer consisting essentially of a polyacrylamide having a content of at least 50 mol percent of amide groups chemically modified to contain dimethylaminomethyl groups, the dimethylaminomethyl groups being further modified by quaternization with an alkylating agent, the chemically-modified polyacrylamide having an intrinsic viscosity in the range of about 0.1 to 0.45 deciliters per gram, measured in 3 molar NaCl at 30° C. to form suspendible flocs from a portion of the solids present; maintaining the suspendible flocs in suspension in said water until a substantial portion of the remaining solids is adsorbed thereto; and thereafter settling the resulting flocs formed.

2. The process of claim 1 wherein the intrinsic viscosity of said chemically-modified polyacrylamide is in the range of about 0.2 to 0.4 deciliters per gram.

3. The process of claim 1 wherein said polyacrylamide has a content of about 60–90 mol percent of chemically-modified amide groups.

4. The process of claim 1 wherein said dimethylaminomethyl groups are further modified by quaternization with methyl chloride.

5. The process of claim 1 wherein said dimethylaminomethyl groups are further modified by quaternization with dimethyl sulfate.

* * * * *